Nov. 11, 1952     C. C. CHAPPLE     2,617,734
THAW INDICATOR
Filed Dec. 15, 1948     2 SHEETS—SHEET 1
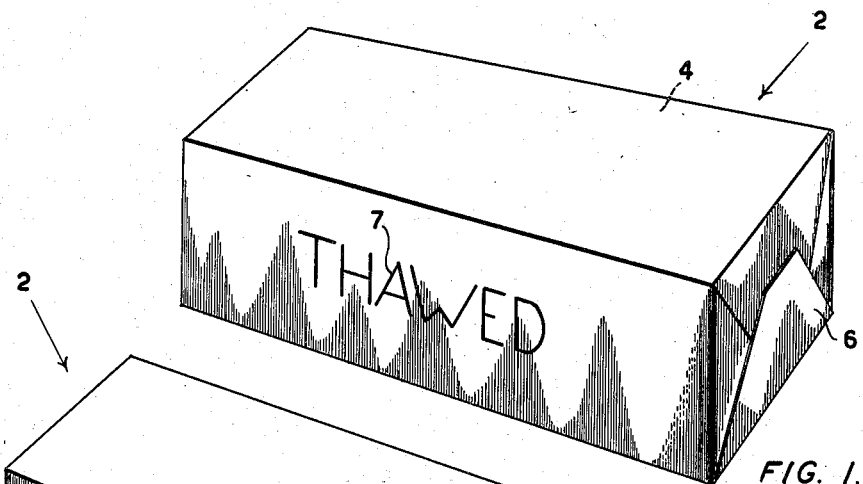
FIG. 1.
FIG. 2.
FIG. 6.
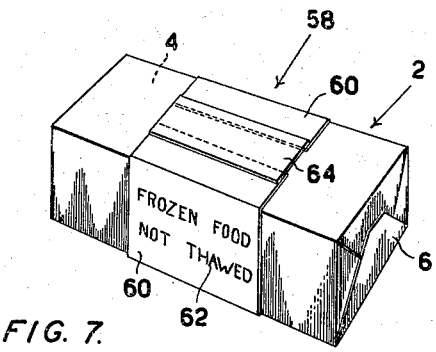
FIG. 7.
INVENTOR.
CHARLES C. CHAPPLE
BY
ATTORNEYS Nov. 11, 1952  C. C. CHAPPLE  2,617,734
THAW INDICATOR Filed Dec. 15, 1948  2 SHEETS—SHEET 2

INVENTOR.
CHARLES C. CHAPPLE
BY
ATTORNEYS

Patented Nov. 11, 1952

2,617,734

UNITED STATES PATENT OFFICE 2,617,734

THAW INDICATOR

Charles C. Chapple, Wyndmoor, Pa.

Application December 15, 1948, Serial No. 65,388

2 Claims. (Cl. 99—192)

This invention relates to an indicator and more particularly to means to indicate whether or not the frozen contents of a package or container has been thawed.

It is well known that in the case of many foods, such as corn, Lima beans, spinach and meats, after they have been quick frozen in any of the conventional ways known to the art for the purpose of preservation, they will not be satisfactory products if thereafter they are thawed and then refrozen, particularly if this second freezing is a slow one such as occurs in the ordinary home or store freezing compartment. In particular, such products are thereby rendered unpalatable and, depending on the product, a varying amount of the total food value is destroyed and the product may be rendered dangerous due to spoiling.

Heretofore there has been no practical means of determining whether or not a thaw has occured prior to tasting the product. Thus when retailers received complaints from their customers they had no means of determining whether the thaw occurred as the result of the carelessness of the customer or as the result of careless thawing by the wholesaler, shipper, manufacturer or other handler of the product. It is apparent that the purchaser of a thawed product is put to a great inconvenience of preparing a spoiled product and is subject to the danger resulting from spoiling.

Generally speaking, this invention relies for its operability on the formation of moisture when a frozen product is thawed. As indicator is provided which reacts on the formation of moisture to give a permanent indication. Thus when and if the moisture disappears, as by refreezing, the indicator will not return to its original state.

On thawing a frozen product package provides moisture from numerous sources. Of particular importance, moisture is formed on the exterior of the package from the air's depositing its contained water on the package due to the cooling of the air by the cold package. The temperature of the package passes through a cool stage when it no longer freezes the condensate but is below room temperature. In addition moisture on the exterior of the package will be formed by the melting of the frosting found on the outside of the package. Further when the contents of the package thaws, all the moisture contained by the product frozen is released to wet the interior of the package.

The means for indicating that a frozen product has been thawed in accordance with this invention comprises an indicator, which is distorted on contact with the moisture formed on thawing. The indicator comprises a highly hydrophilic substance such as, for example, sodium carboxy methyl cellulose. The linters of sodium carboxy methyl cellulose may be formed into a matted sheet which will be opaque. Again the sodium carboxy methyl cellulose may be placed in solution and then formed into a transparent sheet with or without a plasticizer such as for example glycerine or propylene glycol. The formation of such opaque sheets and transparent sheets is well known in the art. Pigments may be used for coloring the sheets as desired.

Although the great utility of this invention and the embodiments thereof are set forth in connection with frozen foods, it will be obvious that it will be variously equally useful in connection with numerous other products which must be maintained continuously frozen.

It is, therefore, an object of this invention to provide an indicator for a frozen product package which will show whether or not the package has been thawed.

A further object of this invention is to provide a frozen product thaw indicator which by absorbing moisture resulting during thawing will be changed in character so as to show that the food has thawed.

An additional object of this invention is to provide a thaw indicator for frozen products which adapts itself readily to automatic packaging methods.

A still further object of this invention is to provide a thaw indicator which will give a permanent indication of the fact that thawing has occurred.

These and other objects of this invention will become apparent on reading the description in conjunction with the drawings in which:

Figure 1 is a front perspective view of a frozen food package;

Figure 2 is a front perspective view of the frozen food package of Figure 1 with a thaw indicator;

Figure 6 is a front view of a modified thaw indicator; and

Figure 7 is a front perspective view of the frozen food package of Figure 1 having a modified thaw indicator.

Figure 4:
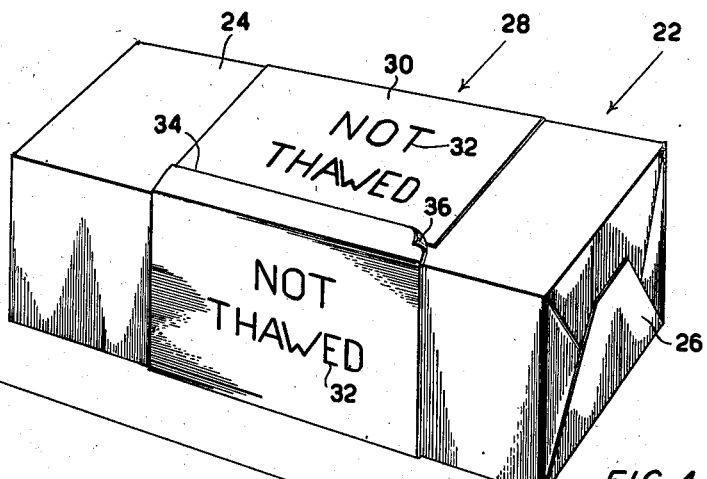
Figure 4 is a front perspective view of a frozen food package having a modified thaw indicator.

As shown in Figure 1, a frozen food package 2 has a cardboard box 4 and a transparent wrapper 6 which may be, for example, cellophane or waxed paper. Printed on wrapper 6 at 7 is the word "Thawed." This printing, of course, could equally well be placed on the box 4.

As shown in Figure 2, the package 2 has a thaw indicator 8 secured to it. The thaw indicator 8 has an opaque sheet 9 formed, for example, from the linters of sodium carboxymethylcellulose. The sheet 9 is secured to wrapper 6 at each of its four corners by an adhesive material 10, as, for example, rubber cement or any conventional adhesive. Sheet 9 has printed thereon the words "This package has not been thawed" at 12.

The sheet 9 is placed on wrapper 6 so as to obscure the word "Thawed" which is printed on wrapper 6. Normally the package is completed as described above prior to freezing. However, it will be apparent that the frozen food product may be first frozen and then placed within the package, the same result being achieved.

When the frozen package is permitted to thaw, it will be apparent, as discussed above, that moisture will be formed on the exterior surface of wrapper 6 and also on indicator 8. As the indicator 8 comes in contact with moisture, the printing "This package has not been thawed" at 12 will become greatly distorted and illegible due to the distortion of the sodium carboxymethylcellulose linters. As the indicator 8 continues to absorb moisture, it will become completely transparent, permitting observation of the word "Thawed" on wrapper 6. Thus the purchaser will be fully informed of the fact that the package has thawed and, it will be noted, that a refreezing will not change the status of the indicator as far as notifying the consumer that the package has been thawed is concerned.

Figure 3:
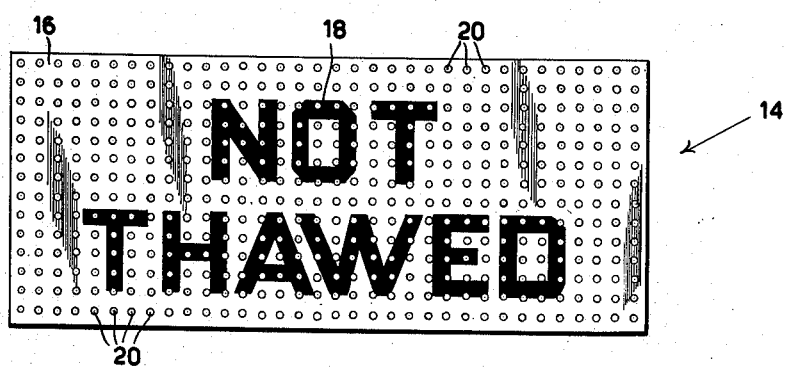
Figure 3 is a front view of a modified thaw indicator.

A modified thaw indicator 14 is shown in Figure 3. The indicator 14 is formed from a sheet 16 of, for example, sodium carboxymethylcellulose linters and has the words "Not thawed" printed at 18. Sheet 16, which is preferably about a hundredth of an inch in thickness, has uniformly spaced perforations 20 which may be, for example, of a radius of about one thirty-second of an inch and, for example, spaced from about one thirty-second of an inch to one sixteenth of an inch apart. The indicator 14 may be secured to the exterior of a package by cementing the corners thereto in a manner identical to the manner in which indicator 8 is secured to package 2.

The indicator 14 as in the case of indicator 8 will, on contact with moisture, distort the letters forming the words "Not thawed" at 18 so as to make them illegible. On further absorption of moisture, the indicator 14 will become entirely transparent. The perforations 20 facilitate the absorption of moisture by the indicator 14 in that they reduce the total amount of sodium carboxymethylcellulose for the given area covered by the indicator and permit the formation of moisture on the surfaces of the package on which the indicator is secured, where this surface is opposite the perforations.

As shown in Figure 4, the thaw indicator may take the form of a tape. Here a frozen food package 22 has a box 24 which may be of cardboard and a wrapper 26 of, for example, waxed paper. A thaw indicator 28 is formed from a transparent sheet 30, for example, formed from sodium carboxymethylcellulose. Sheet 30 has printed thereon the words "Not thawed" at 32. Sheet 30 is wrapped about package 22 and is secured together at 34, for example, by rubber cement 36.

As moisture forms on the exterior of wrapper 26 and on thaw indicator 28, the words "Not thawed" are distorted so as to be illegible and the purchaser is thereby put on notice that the package has been thawed.

Figure 5:
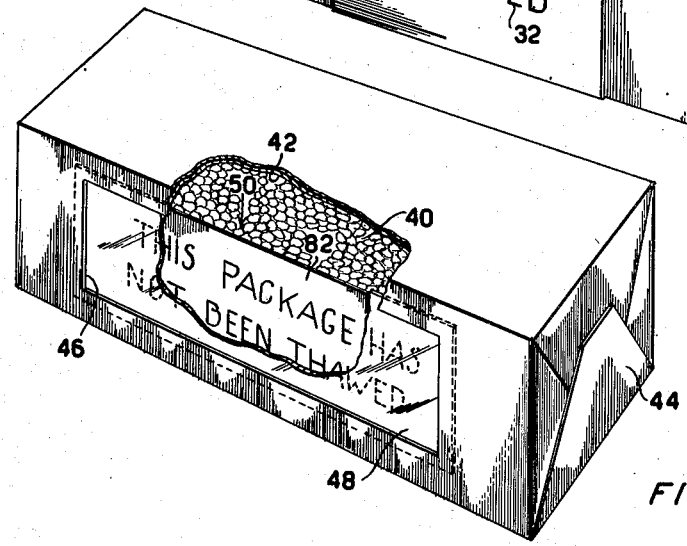
Figure 5 is a front perspective view of a frozen food package having a modified thaw indicator.

As shown in Figure 5, the thaw indicator may alternatively be located inside a frozen food package next to the product frozen. Here we have a frozen food product 40 contained within a box 42 which may be of cardboard and which, in turn, is within a wrapper 44 which may be, for example, of cellophane. Box 42 has a cut-out portion 46. A sheet of cellophane 48 overlies the cut-out portion 46 and is secured to box 42.

Between cellophane sheet 48 and the frozen food product 40 there is a thaw indicator 50. The thaw indicator 50 comprises an opaque sheet 82 formed from, for example, sodium carboxymethylcellulose linters and has printed thereon the words "This package has not been thawed." The printing may be accomplished, for example, with any of the well known edible vegetable dyes.

It is, of course, well known that sodium carboxymethylcellulose is not harmful when taken internally and the small amount involved in the indicator 50 and which would become mixed with the food product would not, in any way, effect the taste qualities or purity of the food product. In this case, as the package is permitted to thaw, the moisture on the food product 40 which is frozen melts and thus supplies moisture to the thaw indicator 50. Here, again, the absorption of moisture by the thaw indicator distorts the words "This package has not been thawed," thus indicating to the purchaser that the package has been thawed.

Again, in Figure 6, a variant embodiment of this invention showing a thaw indicator 54 in the form of a trade-mark or symbol is shown. The thaw indicator 54 may be a stamping 56 formed from a transparent sheet of sodium carboxymethylcellulose which has printing thereon to make the stamping take the appearance of an owl. The indicator 54 may be, for example, secured to the exterior of a frozen food package. On contact with moisture resulting from thawing, the thaw indicator 54 will be distorted thus destroying the trade-mark aspect of the indicator. This provides the purchaser with the knowledge that the maker no longer wishes to place his stamp of approval on the contained product, in this case because it has been thawed.

Referring now to Figure 7, the box 2 of Figure 1 may have a modified indicator 58 which has a band 60. Band 60 is of material which is substantially elastic even when moistened and may be, for example, of ordinary paper, cellophane or the like. Band 60 may carry printing as at 62 to indicate the package contents have not been thawed. Band 60 is tightly wrapped about wrapper 6 and is linked together by a strip 64 of highly hydrophilic material such as, for example, sodium carboxymethylcellulose. Strip 64 may, for example, be adhered to band 60 by any suitable commonly known adhesive.

When package 2 thaws, strip 64 absorbs moisture and is thereby greatly weakened. Since band 60 was tightly wrapped, it pulls apart the thus weakened strip 64 permitting band 60 to fall off package 2. Thus the printing at 62, indicating that the package contents is not thawed, is detached from the package. Further, of course, the word "Thawed" at 7 on wrapper 6 is exposed to view to additionally warn the purchaser.

Although sodium carboxymethylcellulose has been used to exemplify a highly hydrophilic material, numerous other highly hydrophilic substances such as, for example, potassium carboxymethylcellulose, carboxymethylcellulose, other cellulose derivatives, polyvinyl alcohol, pectins and tragacanth may equally well be used in its stead. Where pectin and tragacanth are used, they should have a low moisture content or be plasticized such as, for example, with propylene glycol or glycerine. Polyvinyl alcohol, of course, would not be used where the indicator comes in contact with the frozen product since it should not be taken internally.

It will be apparent that this invention may take the form of numerous other embodiments than those described above for the purposes of illustration and that the invention is not to be limited except as set forth in the following claims.

What I claim and desire to protect by Letters Patent is:

1. In combination with a packaged frozen product, a thaw indicator comprising sodium carboxymethylcellulose and a symbol printed on said carboxymethylcellulose.

2. In combination with a packaged frozen product, a thaw indicator which comprises a distortable hydrophilic substance, printing of a symbol on said substance, said printing being of a water soluble substance.

CHARLES C. CHAPPLE.

REFERENCES CITED

The following references are of record in the file of this patent:

UNITED STATES PATENTS

| Number | Name | Date |
|---|---|---|
| 1,535,536 | MacDonald | Apr. 28, 1925 |
| 2,346,417 | Cornwell et al. | Apr. 11, 1944 |
| 2,373,287 | Bassist | Apr. 10, 1945 |